United States Patent [19]
Ruder, Sr.

[11] Patent Number: 4,942,725
[45] Date of Patent: Jul. 24, 1990

[54] HORIZONTAL CUTTING MACHINE

[76] Inventor: Fred A. Ruder, Sr., 39975 Jones Rd., Wellington, Ohio 44090

[21] Appl. No.: 374,997

[22] Filed: Jul. 3, 1989

[51] Int. Cl.$^5$ .................. A01D 34/06; A01D 34/33; A01D 34/34
[52] U.S. Cl. ................................ 56/16.9; 56/17.6; 56/320.1
[58] Field of Search .............. 56/17.6, 16.9, 320.1, 56/11.4, 264, 296, 297

[56] References Cited

U.S. PATENT DOCUMENTS

| 1,861,816 | 6/1932 | Rawls | 56/297 |
| 2,157,041 | 5/1939 | Wagner | 56/297 |
| 2,241,495 | 5/1941 | Wagner | 74/11 |
| 2,505,296 | 4/1950 | Miller | 56/320.1 |
| 2,680,340 | 6/1954 | Pazandak | 56/17.6 |
| 3,058,286 | 10/1962 | Miller | 56/17.6 |
| 3,134,213 | 5/1964 | Goetz | 56/17.6 X |
| 3,430,421 | 3/1969 | Matthews | 56/16.9 X |
| 3,657,868 | 4/1972 | Cousino | 56/17.6 X |
| 3,979,827 | 9/1976 | Anzur | 56/16.9 X |
| 4,048,791 | 9/1977 | Treen | 56/17.6 |
| 4,107,906 | 8/1978 | Cousino | 56/17.6 X |

FOREIGN PATENT DOCUMENTS 608337 1/1979 Switzerland .
1434903 5/1976 United Kingdom .

Primary Examiner—Hoang C. Dang
Attorney, Agent, or Firm—Gustalo Nunez

[57] ABSTRACT

A machine for mowing grass, weeds, vegetation and the like is disclosed herein. The machine is a conventional rotary type lawn mower converted to a sickle-type cutting machine which enables the user to cut vegetation around trees, fence posts, rocks, etc. In use, the blade of a conventional rotary lawn mower is removed, thus exposing the power drive shaft. A torque converter is mounted onto the power drive shaft. The torque converter is connected to a transfer block by means of an endless belt. The transfer block is designed to transfer the circular motion imposed upon it by the power drive shaft and converting this circular motion into a reciprocating movement which is used to power a reciprocating cutting blade. The cutting blades are superimposed upon each other and one of the blades is free to move with respect to the other. The transfer block can be mounted onto the underside of the lawn mower by conventional bolts and includes a driving pulley and a cam which rotates with the pulley, said pulley being driven by the endless belt. The rotating cam engages the moveable cutting blade which results in a reciprocating cutting blade which is then used to cut the vegetation. The transfer block is made such that it is adjustable in a vertical direction and can therefore accommodate mowers of all types, regardless of the deck height.

3 Claims, 5 Drawing Sheets

HORIZONTAL CUTTING MACHINE

The present invention relates to a cutting machine which can be used to cut vegetation efficiently and effectively in areas containing obstructions such as trees, rocks, posts, etc. Further, the invention is disclosed in a Disclosure document filed by the inventor with the U.S. Patent and Trademark Office on Jul. 29, 1988, being Disclosure No. 197855. The disclosure document is herein incorporated by reference and made a part of this application. A conventional lawn mower is neither as efficient nor effective as the instant invention for the reason that the mechanical structure of a conventional lawn mower does not allow the user to cut near the aforementioned obstructions.

As is well known, conventional lawn mowers can be classified as rotary type and reel type in operation. The rotary type comprises a rotatable blade housed within the lawn mower deck. The lawn mower deck and the wheels preclude the user from cutting close to such things as trees.

Likewise, the reel type is a lawn mower having a plurality of blades which rotate in the direction parallel to the ground and in a direction away from the user. This type of construction does allow the user to cut somewhat closer to some obstructions such as trees, but not as closely or as efficiently as the instant invention.

U.S. Pat. No. 2,157,041 discloses a cutting machine with an associated reciprocating cutting bar. The cutting machine could be used to cut vegetation immediately adjacent some obstruction such as a tree or fence post. But due to the inherent construction of the machine, it can be said that the cutting machine as described would be difficult to operate because of its instability. The user must perform a balancing act when using this cutting machine, which reduces its effectiveness. U.S. Pat. No. 2,241,495, which is a divisional of U.S. Pat. No. 2,157,041, operates in the same manner as its companion and thus, the same remarks apply.

U.S. Pat. No. 1,861,816 also employs a reciprocating cutting bar which, like to above two inventions, is mounted on a single wheel frame and which is powered by a side mounted engine. This results in an unbalanced machine which reduces the cutting effectiveness of the machine and makes the machine unwieldy to operate.

The prior art cutting devices do not disclose a conventional rotary mowing machine which can be used to power a side bar cutter. The invention described herein discloses a side bar cutter which can be easily and economically attached to a rotary type lawn mower.

SUMMARY OF THE INVENTION

The problems of the aforementioned prior art are obviated by the instant invention. As with all conventional rotary mowing machines, the mowing machine to be converted has a power driving source, e.g. gasoline engine or electric motor, a mower deck for supporting the power driving source and the rotary mowing blades, and wheels for propelling the mower, and is converted into a reciprocating cutting machine. The rotary blades are removed, thus exposing the mower drive shaft. A torque converter is mounted onto the exposed drive shaft. A torque converter is a pulley type element which houses a pair of centrifugally spring held weights. At the time the lawn mower is started, the weights are not in contact with the pulley elements, thus there is no load on the mower at the time the starting cord is pulled or at the time the electric starter is initiated. This type of torque converter facilitates the starting process.

A transfer block is attached to the underside of the mower deck by conventional mounting means. The transfer block is connected in a driving relationship with said torque member by means of an endless belt, said transfer block including an idler pulley and a driving pulley. At one end, longitudinally opposed to said driving pulley is disposed a circular boss, being positioned at a location off center from the longitudinal axis of said driving pulley, said boss being secured to a bearing member to which the driving pulley is connected.

Mounted to said transfer block is a cutting bar comprising a pair of superimposed cutting bars, each having a plurality of cutting teeth which, when placed in a reciprocating motion, operate to cut vegetation. Said cutting bar being provided at the end adjacent said transfer block with an elongated slot, perpendicular to the longitudinal axis of said cutting bar. The cutting bar is mounted on the transfer block such that the circular boss is contained within the elongated slot thus being in driving engagement with said slot. At the time the mowing machine is powered, rotating motion will be imposed on the driving pulley, likewise this same driving motion will be imparted to the off center circular boss. As the boss rotates, the elongated slot will be moved in a reciprocating fashion thus resulting in the cutting blades being moved in a reciprocating fashion; in such state, the cutting bar will be ready to cut vegetation or the like.

DETAILED DESCRIPTION OF THE PREFERRED EMBODIMENT

The invention described herein consists of a cutting member along with an associated driving member attached to the underdeck of a conventional rotary member. For purposes of simplicity, the lawn mower is not shown.

Figure 1:
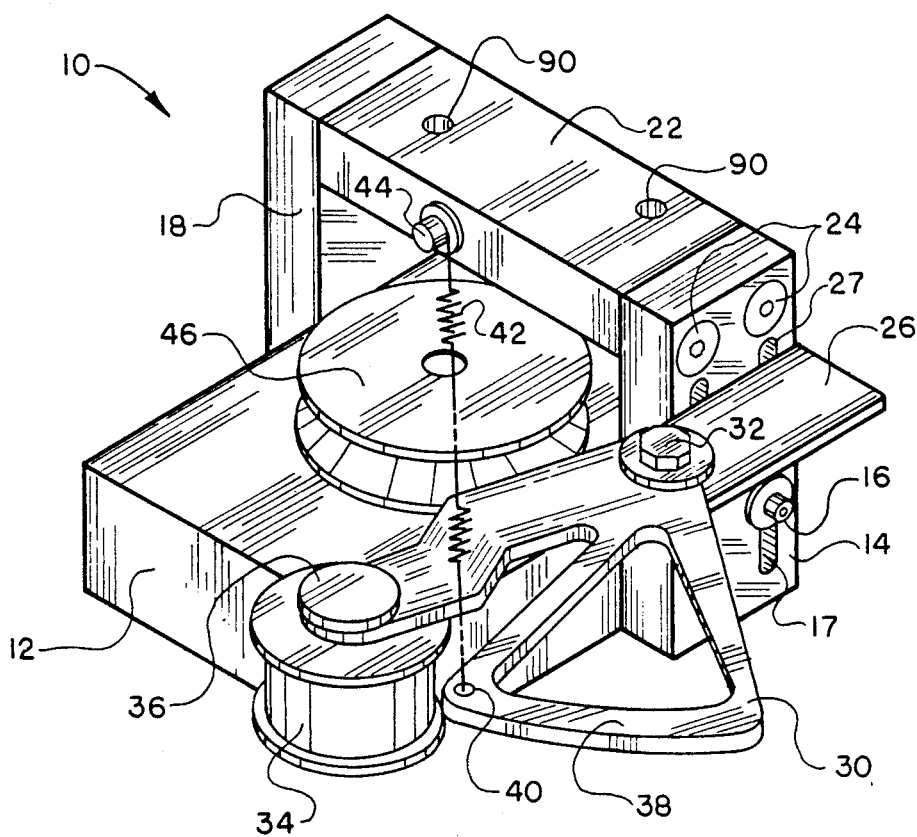
FIG. 1 is a perspective view of the transfer block illustrating the idler pulley and driving pulley.
Figure 2:
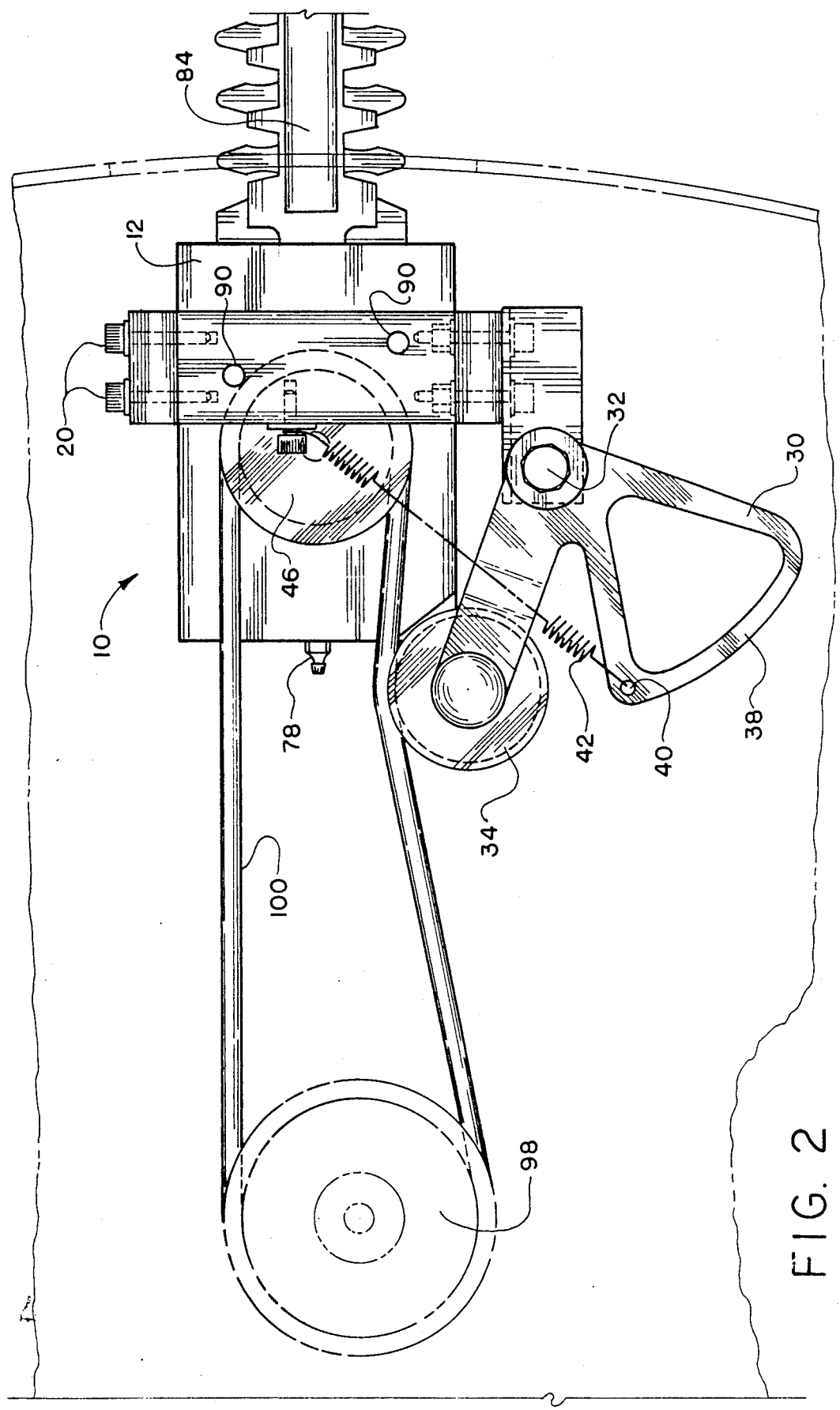
FIG. 2 is a top plan view of the transfer block illustrating the transfer block driving pulley connected to an endless belt and a partial top view of the cutting bar and further illustrating the underside of the lawn mower deck to which the transfer block is attached.

Referring to FIG. 1, there is illustrated a preferred transfer block 10 according to the invention which consists of base support member 12 which is generally rectangular in configuration. A first connecting side support member 14 is affixed to one side of said base support member 12 by conventional bolt means 16. Similarly, a second connecting side support member 18 is affixed to another side of said base member 12, in direct opposition as the side to which the first connecting member 14 is attached, said second member being attached by conventional bolt means (not shown) such that said first and second connecting side support members are positioned directly opposite each other. Although only two bolts 20 (FIG. 2) are shown on the second connecting side support member 18, there are four bolts, two at the bottom and two at the top, similar to bolts 16 and 24 shown in FIG. 1. A third connecting member 22 is disposed between the two connecting members 14 and 18 and connected by conventional bolt means 24 onto the first connecting side support member 14 and said third connecting member 22 being connected at its other end onto the second connecting side support member 18 by conventional bolt means 20 (FIG. 2). Connecting members 14 and 18 are similar in physical configuration excepting a few minor differences. The first connecting side support member 14 includes a set of elongated holes 17 at one end thereof and similarly, said second connecting side support member 18 includes a set of elongated holes (not shown) at one end thereof, wherein the elongated holes are directly opposite each other when said first and second side support members 14 and 18 are connected to the third connecting member 22. In addition, the first side supporting member 14 includes yet another set of elongated holes 27 whose purpose shall be subsequently explained. The elongated holes 17 allow the base support 12 to be adjusted at a desired distance from said third connecting member 22.

Mounted onto the first connecting member 14 is an L-shaped support member 26 which is held in place by conventional bolt means 28 which engage elongated holes 27. Pivotally disposed on said L-shaped support member is an idler arm 30 which is pivotally connected by a bolt 32 which serves as a bearing member. A pulley member 34, hereinafter referred to as idler pulley 34, is rotatably connected to said idler arm 30 by bearing member 36. Extending obliquely from said idler arm 30 is a triangularly shaped member 38, which in the preferred embodiment is integral to said idler arm 30. Positioned on one point of the triangularly shaped member is an opening 40. Although member 38 is shown to be triangular in shape, it definitely need not be restricted to such a configuration. For example, the idler arm 30 can function just as well in most other configurations, just so that there is provided means for attaching a biasing spring 42 to the triangularly shaped member 38 at opening 40 at one end and at the other end of spring 42, to the transfer block 10 and preferably to the third connecting member 22 at 44, said connecting means illustrated in FIG. 1 being a bolt and washer. The connecting means at 44 can also, for example, simply be an eye member, but it has been found that it is economically feasible to use bolt means rather than welding eyelets to said third support member 22.

Figure 4:
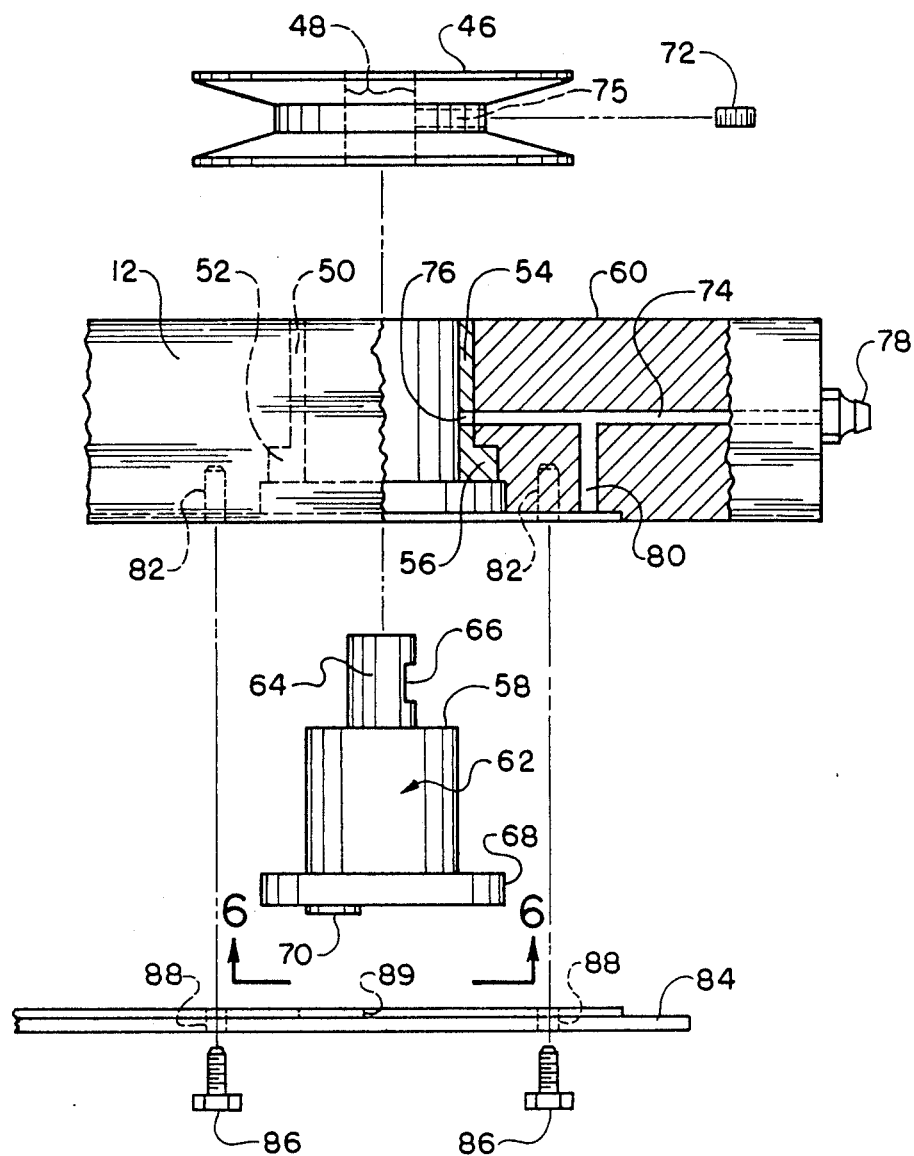
FIG. 4 is a fragmentary side view of the transfer block taken along the side to which the idler pulley is attached to, and illustrating the transfer block with parts broken away.
Figure 5:
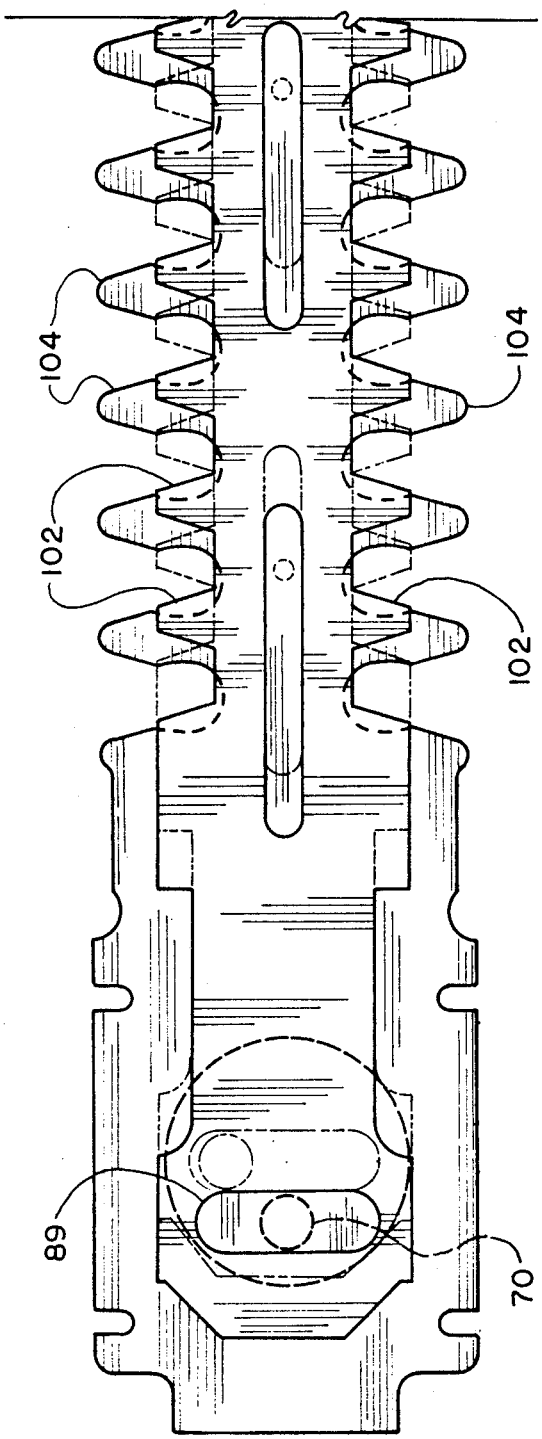
FIG. 5 is a top plan view illustrating the cutting bar teeth in their most extreme cutting positions.
Figure 6:
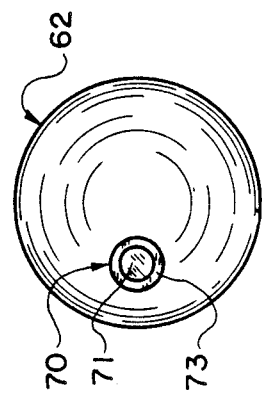
FIG. 6 is a bottom view of the bearing member taken along lines 6—6 of FIG. 4.

A pulley 46 is rotatably mounted on base support member 12 (see FIG. 4). Pulley 46 is provided with an opening 48, as is base member 12 with an opening 50. Opening 50 is provided with a shoulder 52 for reasons which will soon be apparent. A bushing 54 with a shoulder 56 is inserted into opening 50 such that terminating end 58 is flush with the surface 60 of base support member 12. Bushing 54 is sweated in place by conventional means such as heat. Pulley 46 also includes a key passageway 75 for the insertion of a keyway 72 which, in the instant invention, is threaded.

A bearing member 62 is provided with an extending rod 64 having a key way slot 66. Said bearing member 62 further includes a shoulder 68. Bearing member 62 is fabricated as one integral unit. On the outside surface of shoulder 68 there is disposed a circular cam or boss 70 and held in place by conventional means such as by a pressure fit or sweating means. The boss 70 consists of a very durable material such as drill rod being inserted into a hole located on the outside surface of shoulder 68. The drill rod 71 is located at a predetermined distance from the longitudinal axis of the bearing 62. A washer 73 is placed over the drill rod 71 and is of a dimension such that the washer 73 is freely rotatable about the drill rod 70.

Bearing 62 is passed through opening 50 and is of a length such that the rod 64 extends beyond the base support surface 60. Pulley 46 is mounted onto rod 64 and held in place by key 72 which is threadedly locked onto rod 64 by means of the keyway slot 66. Pulley 46, connected to rod 64, is freely rotatable with respect to the base member 12. An elongated passageway 74 is such that it extends to the external surface of base support 12 at one end and, at the other end, it extends to the bushing 54 and in which said passageway is in alignment with an opening 76 on bushing 54. A lubricating fitting 78 is provided at the external surface of base support 12 such that the lubricating fitting 78 is in alignment with a passageway formed by openings 74 and 76. A passageway 80 is disposed on the base support 12 and intersects with passageway 74.

Base support member 12 is also provided with a plurality of threaded holes 82; four are preferred. Cutting bar member 84 is mounted onto the bottom of base support member 12 by bolts 86 which pass through openings 88 located on the cutting bar member 84 and said bolts 86 are threadedly engaged by threaded holes 82. Bar member 84 is also provided with an elongated slot 89 having a width sufficient to snugly receive the boss 70. Still referring to FIG. 3, illustrated is the cutting bar 84 attached to the underside of base support member 12 by bolts 86 in which cam 70 is in alignment with a slot 89, said slot being positioned on the cutting bar 84.

The third connecting member 22 is provided with at least two openings 90. The transfer block 10 is attached to the underside of a rotary mower deck 92 by passing conventional bolt means 94 through the openings 90 and through openings 96 located on the deck 92 (FIG. 3).

Figure 3:
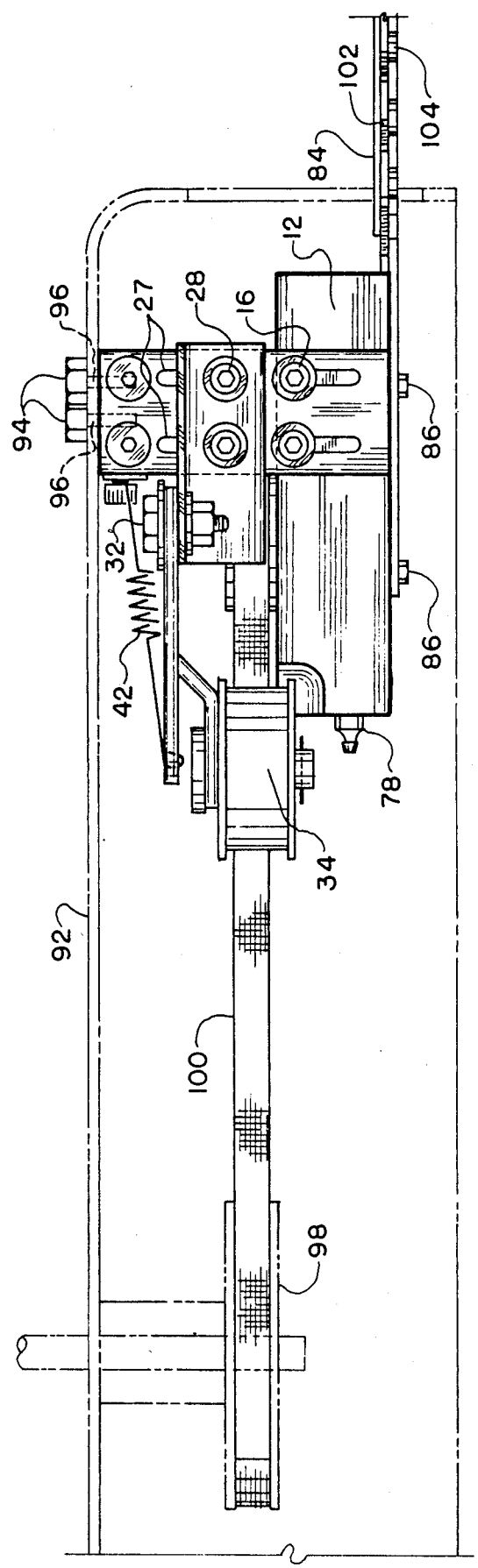
FIG. 3 is a side plan view of the transfer block taken along the side to which the idler pulley is connected and illustrating the lawn mower deck to which the transfer block is connected.

Referring to FIGS. 2 and 3, it can be seen that pulley 46 is connected to a torque converter 98 by means of an endless belt 100. The torque converter 98 is provided with a pulley type wheel for retaining belt 100. The torque converter is connected to the drive shaft of the rotary mower. The idler pulley 34 applies tension on the belt 100 by means of the biasing spring 42, thereby insuring that the belt 100 will remain on the torque converter 98 and pulley 46 in the absence of a driving force. The cutting bar 84, which is a shelf item, can be purchased at most lawn mower stores and no claim is made to the cutting bar 84. The elongated slot 89 is designed to receive boss 70. At the time power is applied to the torque converter 98, pulley 46 is placed into rotation by means of the belt 100. This causes boss 70 to rotate about the longitudinal axis of the bearing 62 which results in a reciprocal motion being applied to the cutting bar teeth 102 by means of the reciprocating slot 88. It is the reciprocating motion of the teeth 102 in relationship with the stationary teeth 104 which enables the user of the machine to cut vegetation. The reciprocating action is directed by the movement of the offset boss 70 in combination with the washer 73 and drill rod 71, as it rotates about the longitudinal axis of the bearing 62. The boss 70 causes the elongated slot to move in a back and forth action as the boss makes an orbit about the bearing 62 axis.

It has been found that the bushing 54 is best manufactured from a brass material and the transfer block from materials such as steel. These materials are mentioned by way of example only and it by no means is intended to restrict this invention by these materials.

The passageways 74 and 80 permit the rotating bearing 62 and cutting bar to be lubricated.

It is noted that this invention may be embodied in other specific forms without departing from the spirit thereof. The preferred embodiment illustrated herein is therefore to be considered in all respects as being illustrative and not restrictive, the scope of the invention being indicated by the appended claims, rather than by the foregoing specification.

What I claim is:

1. A mowing machine and power driving source comprising:
   a mowing deck including an underside deck surface,
   a transfer block including a base support, having a plurality of sides,
   a first connecting member affixed to one of said sides of said base support,
   a second connecting member affixed to another of said base support sides,
   a third connecting member connected to said first and said second connecting members such that a generally rectangular configuration is described by said base support member and said first, second and third connecting members, said third connecting member being attached to the underside deck of said mowing machine, said base support member being further supplied with an opening having a longitudinal axis generally parallel to a plane described by said first, second and third connecting members,
   a bearing member including a bearing surface and a keyway slot at one end of said bearing surface, said bearing being slidingly inserted into said opening located on said base support, said bearing member further including on one terminating end thereof, a boss disposed on said end of said bearing member and positioned a certain distance away from the longitudinal axis of said bearing member,
   a pulley member mounted on said bearing member, and including keyway means for fastening said pulley to said bearing member,
   an idler arm adjustably mounted on one of said connecting members, said idler arm further including an idler pulley,
   a torque converter extending from said power driving source and being connected to said pulley member via an endless belt, and
   a bar cutter, having an elongated slot, mounted onto said base support member such that said boss sits within said slot such that when rotational motion is applied to said pulley member said boss member imparts reciprocating movement to said bar cutter containing said slot.

2. In a mowing machine, a cutter mechanism comprising:
   a power driving source,
   a plurality of ground engaging wheels,
   a deck having an upperside, underside, said upper side supporting said power driving source,
   a top support member having first and second terminating ends, secured to the underside of said deck,
   side support means secured to said first and second terminating ends of the top support,
   a base support connected to said side support means, said base support having an opening therethrough, and a bushing secured in said opening,
   a bearing member slideably inserted in said bushing, said bearing member having a slot on one end thereof, and a boss at another end thereof,
   a first pulley member mounted on the slot end of said bearing member and secured thereto by keyway means in combination with said slot,
   a generally horizontally disposed side arm secured to one of said side support means,
   a pulley support member rotateably attached to said side arm,
   a second pulley member attached to said pulley support member,
   biasing means secured to said pulley support member whereby said second pulley member and said pulley support member being biased in a direction towards said first pulley member,
   a reciprocating cutting bar having a slot at one end thereof, said cutting bar secured to said base support such that said cutting bar slot is in engagement with said boss, and
   said pulley disposed on the base support and said pulley disposed on said pulley support arm being rotatably engaged with said power driving source by means of an endless belt.

3. In a mowing machine, a cutting mechanism comprising:
   a power driving force,
   a plurality of ground engaging wheels,
   a support deck having a topside and an underside, said power driving source secured and supported by said support deck,
   a top support, having first and second terminating ends, secured to said underside,
   a first and second side support member attached to said first and second terminating ends respectively of said top support,
   a base support connected to said first and second side support members, said base support member being adjustable in a vertical direction with respect to said first and second side support members, said base support having an opening therethrough and a bushing secured in said opening,
   a bearing member having a boss at one end thereof and a keyway slot at another end thereof, said bearing member slideably inserted in said bushing,
   a pulley mounted on the slot end of said bearing member and secured thereto by key means in combination with said keyway slot, thereby rotatably securing said pulley to said base support,
   an idler pulley support secured to one of said first and second side support members, said idler pulley support being adjustable with respect to said first or second side support,
   an idler pulley rotatably secured to said idler pulley support,
   means for biasing said idler pulley towards said top support, an elongated cutting bar including a first set of cutting teeth and a second set of cutting teeth, said second set of cutting teeth superimposed on said first set of cutting teeth, and said second set of cutting teeth being reciprocably moveable in a longitudinal direction defined by said elongated cutting bar, said second set of cutting teeth further including an elongated slot at one end thereof, said cutting bar secured to said base support such that said slot is in engagement with said boss, and said pulley being rotatably secured to said base support, being in rotational engagement with said power driving source by means of an endless belt, said idler pulley applying a biasing force on said endless belt in a direction which increases tension of said endless belt between said pulley and said driving source.

* * * * *